United States Patent [19]

Popendorf

[11] 4,284,383
[45] Aug. 18, 1981

[54] CASSETTE FILTER EJECTOR

[75] Inventor: William J. Popendorf, Berkeley, Calif.

[73] Assignee: The Regents of the University of California, Berkeley, Calif.

[21] Appl. No.: 114,755

[22] Filed: Jan. 24, 1980

[51] Int. Cl.³ .............................................. B01D 35/00
[52] U.S. Cl. ..................................... 414/417; 210/238
[58] Field of Search ........................... 414/417; 73/28; 210/238

[56] References Cited

U.S. PATENT DOCUMENTS

| 1,053,287 | 2/1913 | Giese | 210/238 |
| 2,366,886 | 1/1945 | Van Tuck | 414/417 |
| 3,608,946 | 9/1971 | Erickson | 210/238 |
| 3,780,892 | 12/1973 | Frank | 414/417 X |

Primary Examiner—Robert W. Saifer

[57] ABSTRACT

A filter disc ejector has a base with an upstanding central post and with a surrounding peripheral wall in some portions higher than the post and in other portions lower than said post to expose side portions of the rim of a filter disc cassette on the post.

5 Claims, 4 Drawing Figures

CASSETTE FILTER EJECTOR

BRIEF SUMMARY OF THE INVENTION

An ejector is for a filter disc disposed in a cassette surrounding the filter disc and having a central aperture beneath the filter disc. The ejector has a base on which is an upstanding post slidably receivable in the disc aperture. There is a vertically undulatory guide wall substantially concentric with the post and upstanding from the base to heights greater than and less than that of the post. The guide wall has an inwardly and downwardly beveled top edge.

DETAILED DESCRIPTION

Figure 1:
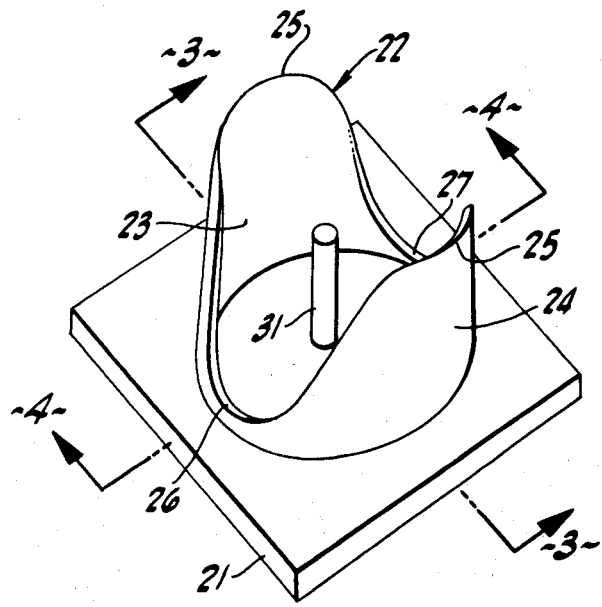
FIG. 1 is an isometric view of the ejector itself.
Figure 2:
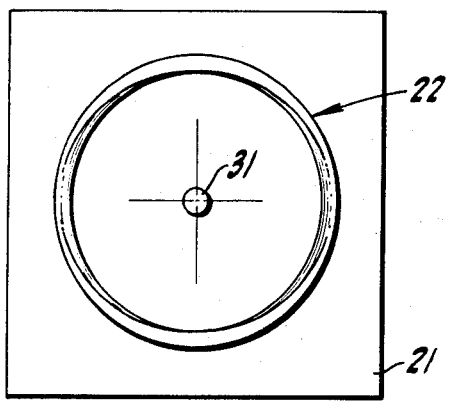
FIG. 2 is a plan of the ejector itself.

In the usage of materials for absorbing or receiving various particles or foreign bodies from the atmosphere and the like, it is customary to carry a filter-like, receiving disc in a carriage or cassette or carrier. This is often of a circular or ring shape itself and has a central boss with an aperture therethrough. The carrier is often rimmed. The filter disc is positioned over the aperture and within the upstanding rim of the carrier or cassette. A difficulty arises in that processing of a used or charged cassette disc is awkward because it is necessary to withdraw the filter disc from the cassette without in any way contacting or disturbing the sensitized or exposed surface of the filter disc. Because of the surrounding rim of the cassette and the rather delicate nature of the operation, the customary practice provides a certain amount of deleterious reaction on the filter disc.

It is therefore an object of the invention to provide an ejector of assistance in removing a filter disc from its holding cassette in a way not to encroach upon or damage the effective surface of the filter disc.

An arrangement of this sort has with some success been embodied as shown herein. In this arrangement, the cassette 6 is a generally cylindrical body symmetrical about a central axis 7. It includes a planar cross wall 8 or web of generally circular character merging with a central, down-extending boss 9 having an axial opening 11 therethrough. The web 8 has an upstanding shoulder 12 around it on which the edge of a filter disc 13 can rest. The disc 13 is generally also protected by a surrounding rim or flange 14. This preferably has an external taper 15 from the median portion inwardly and upwardly and similarly has an external taper 16 inwardly and downwardly.

Figure 3:
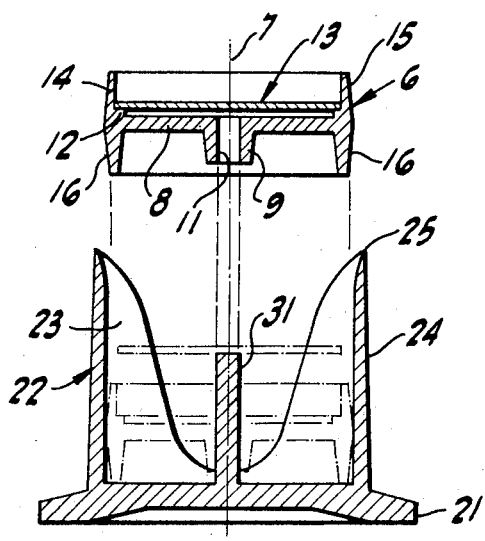
FIG. 3 is a compound cross-section, the plane of which is indicated by the line 3—3 of FIG. 1, and shows the ejector and a cassette and filter disc in association therewith.

In the usual use of this device, a fresh filter disc 13 is deposited in the cassette 6, as shown in FIG. 3, and then is exposed. Airborne materials are deposited on the upper surface of the filter disc 13 for subsequent processing. The difficulty arises in trying to withdraw the filter disc 13 from the cassette 6 and particularly from within the surrounding rim 14 without disturbing the filter upper surface.

Particularly to aid in that job, a special ejector is provided. This is a device customarily constructed of plastic having a suitable flat, generally rectangular base 21. Arising from the base is an upstanding guide wall 22. This is substantially circular cylindrical on its inside surface 23 and is slightly inwardly tapered or conical in an upward direction on the outside surface 24. The inner surface 23 and the outer surface 24 merge at an upper edge 25 of the device. Preferably, the inner surface 23 at its top tapers outwardly and upwardly to afford a smooth edge and to allow easy and guided access to the interior of the device.

Figure 4:
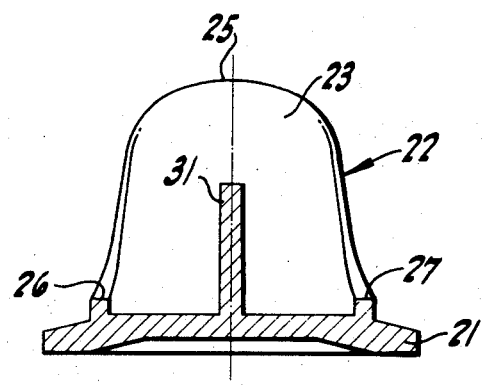
FIG. 4 is a cross-section, the plane of which is indicated by the line 4—4 of FIG. 1.

The guide wall 22 is continuous in some portion of the structure, but preferably in two opposite or diametrical portions the wall is cut away or omitted from the top down to leave free spaces or low portions 26 and 27 (FIG. 1) or a substantially sinuous or undulatory upper rim. The wall spaces extend downwardly almost to the level of the base 21. Stated differently, the guide wall 22 has two heights, one relatively far above the base to a top level and the other relatively close to the base to a bottom level. Usually, the upper rim of the lower part of the undulatory wall is not tapered, but is relatively square or blunt, as shown in FIG. 4.

On the axis 7 and on the base 21 there is an upstanding, central, cylindrical post 31. This is of considerably lesser height than that of the upstanding guide wall 22 at its high portions and is of substantially greater height than that of the guide wall 22 at its low portions. The post 31 is flat on top, circular in cross-section, and has a slightly smaller diameter than that of the cassette opening 11.

In the use of this device, the cassette 6, as shown in the upper portion of FIG. 3 with the filter disc 13 in position, is placed well above the base 21 and is then gently lowered. The cassette is initially guided by the wall taper 16. As the cassette lowers, it continues to be guided by the high portions of the wall 22, so that the opening 11 in the boss 9 rides onto the upstanding central post 31. There is adequate travel so as to guide the cassette into position firmly on the post. The user's fingers are not interfered with, as they can easily operate in the two opposite, cutaway, free spaces 26 and 27.

As the cassette lowers on the post, it eventually gets to a point low enough so that the also-descending filter disc 13 rests upon the flat upper surface of the central post 31. The filter disc can then descend no more, although the cassette itself continues to be lowered. Eventually the cassette is deposited at the bottom of the ejector mechanism resting on the base 21, whereas the separated filter disc rests freely on the central post, being relatively well balanced there and at most being only in light contact with the partial, surrounding wall 22. It is then easy for the operator, using a handling tool, to take hold of the ejected filter disc and to carry it from the ejector for further handling. He then lifts out the cassette for future use.

In general, with this mechanism, it is possible to use the regular cassette and filter disc arrangement and to eject the filter disc from the cassette without touching the surface of the filter disc or causing any difficulty and certainly without bending or distorting the filter disc.

I claim:

1. A cassette filter ejector for a cassette having a central aperture and having a rim and adapted to carry a filter disc within said rim and overlying said aperture comprising a base, a central post upstanding from said base to a predetermined height and adapted slidably to be received in said aperture, and a guide wall upstanding from said base concentric with said post and adapted slidably to receive said cassette, said wall including a guide portion higher than said height and another portion lower than said height for receiving a user's finger against a cassette on said post.

2. A device as in claim 1 in which said guide wall includes portions both higher and lower than said predetermined height and smoothly merging with each other.

3. A device as in claim 2 in which there are at least two of said lower portions disposed diametrically opposite each other.

4. A device as in claim 1 in which the upper margin of said guide wall is undulatory.

5. A device as in claim 4 in which said upper margin is beveled inwardly and downwardly.

* * * * *